(12) United States Patent
Aiso

(10) Patent No.: US 9,075,411 B2
(45) Date of Patent: Jul. 7, 2015

(54) ROBOT SYSTEM, CALIBRATION METHOD OF ROBOT SYSTEM, ROBOT, CALIBRATION DEVICE, AND DIGITAL CAMERA

(71) Applicant: Seiko Epson Corporation, Tokyo (JP)

(72) Inventor: Seiji Aiso, Shiojiri (JP)

(73) Assignee: Seiko Epson Corporation (JP)

( * ) Notice: Subject to any disclaimer, the term of this patent is extended or adjusted under 35 U.S.C. 154(b) by 108 days.

(21) Appl. No.: 13/860,182

(22) Filed: Apr. 10, 2013

(65) Prior Publication Data
US 2013/0274921 A1 Oct. 17, 2013

(30) Foreign Application Priority Data
Apr. 12, 2012 (JP) .................... 2012-090844

(51) Int. Cl.
G12B 13/00 (2006.01)
G01B 5/004 (2006.01)
G06F 19/00 (2011.01)
B25J 9/02 (2006.01)
G05D 3/00 (2006.01)
B25J 9/16 (2006.01)

(52) U.S. Cl.
CPC .............. G05D 3/00 (2013.01); *Y10S 901/47* (2013.01); *Y10S 901/02* (2013.01); *Y10S 901/09* (2013.01); B25J 9/1692 (2013.01); B25J 9/1697 (2013.01); *G05B 2219/39008* (2013.01); *G05B 2219/39022* (2013.01)

(58) Field of Classification Search
USPC ......... 700/245, 251, 248, 246, 247, 254, 258, 700/259; 73/1.01; 348/61; 33/503
See application file for complete search history.

(56) References Cited

U.S. PATENT DOCUMENTS

| 5,329,469 | A |  | 7/1994 | Watanabe |
| 6,300,974 | B1 | * | 10/2001 | Viala et al. ...................... 348/61 |
| 2005/0166413 | A1 | * | 8/2005 | Crampton ....................... 33/503 |
| 2005/0273199 | A1 | * | 12/2005 | Ban et al. ...................... 700/248 |
| 2008/0216552 | A1 | * | 9/2008 | Ibach et al. .................... 73/1.01 |

FOREIGN PATENT DOCUMENTS

| JP | 02-262991 | 10/1990 |
| JP | 04-035885 | 2/1992 |
| JP | 05-038688 | 2/1993 |
| JP | 09-128549 | 5/1997 |

* cited by examiner

Primary Examiner — Ronnie Mancho
(74) Attorney, Agent, or Firm — Harness, Dickey & Pierce, P.L.C.

(57) ABSTRACT

A robot system includes a movable component with a mark thereon, a control unit that controls the movable component in a three-dimensional coordinate system on the basis of control information, a digital camera that outputs image data by imaging a range of movement of the mark, and a calibrator that creates a transformation parameter for correlating a two-dimensional coordinate system of the image data with the three-dimensional coordinate system on the basis of the image data obtained by imaging the mark at different positions and the control information.

6 Claims, 3 Drawing Sheets

ROBOT SYSTEM, CALIBRATION METHOD OF ROBOT SYSTEM, ROBOT, CALIBRATION DEVICE, AND DIGITAL CAMERA

BACKGROUND

1. Technical Field

The present invention relates to a robot system, a calibration method of a robot system, a robot, a calibration device, and a digital camera.

2. Related Art

A conventional robot system manipulates a workpiece with an arm while imaging the workpiece through the use of a digital camera. In order to activate such a robot system, it is necessary to perform a calibration operation of correlating a coordinate system for controlling the arm with a coordinate system of image data output from the digital camera. JP-A-4-35885 discloses a technique of performing a calibration operation by imaging a pattern plate while causing an arm to move while the pattern plate having a specific image formed thereon is grasped by the arm of a robot.

However, as disclosed in JP-A-4-35885, when the pattern plate for calibration is used, a user of the robot system has to store the pattern plate and prepare the pattern plate for each calibration. This requirement is burdensome and troubling.

SUMMARY

An advantage of some aspects of the invention is to facilitate calibration of a robot system.

An aspect of the invention is directed to a robot system including: a movable component with a mark attached thereto; a control unit that controls the movable component in a three-dimensional coordinate system on the basis of control information; a digital camera that outputs image data by imaging a range of movement of the mark; and a calibrator that creates a transformation parameter for correlating a two-dimensional coordinate system of the image data with the three-dimensional coordinate system on the basis of the image data obtained by imaging the mark controlled at different positions and the control information.

According to this configuration, since a mark is attached to the movable component, a user does not have to store a pattern member or prepare a pattern member for each calibration. Therefore, it is possible to facilitate calibration of a robot system.

In the robot system, the calibrator may create the transformation parameter on the basis of the image data obtained by imaging the mark controlled at six different positions.

By employing this configuration, the two-dimensional coordinate system and the three-dimensional coordinate system can be correlated with each other as follows. That is, when the coordinate of the mark in the two-dimensional coordinate system is expressed by $(x_i, y_i)$ (where $i=1, 2, \ldots, 6$), the coordinate of the mark in the three-dimensional coordinate system is expressed by $(X_i, Y_i, Z_i)$, $m=(M_{11}, \ldots, M_{34})$ is defined, and the correspondence relationship between the two-dimensional coordinate system and the three-dimensional coordinate system is expressed by the following expression, $$s_i \begin{pmatrix} x_i \\ y_i \\ 1 \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} X_i \\ Y_i \\ Z_i \\ 1 \end{pmatrix},$$

an eigenvector $m=(M_{11}, \ldots, M_{34})$ of a matrix expressed by the following expression may be used as the transformation parameter:

$$\sum_i \{A(x_i, X_i)^T A(x_i, X_i)\}.$$

The invention can be implemented as a calibration method of a robot system, a calibration device separated from a robot and a digital camera, and a digital camera having a calibration function.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
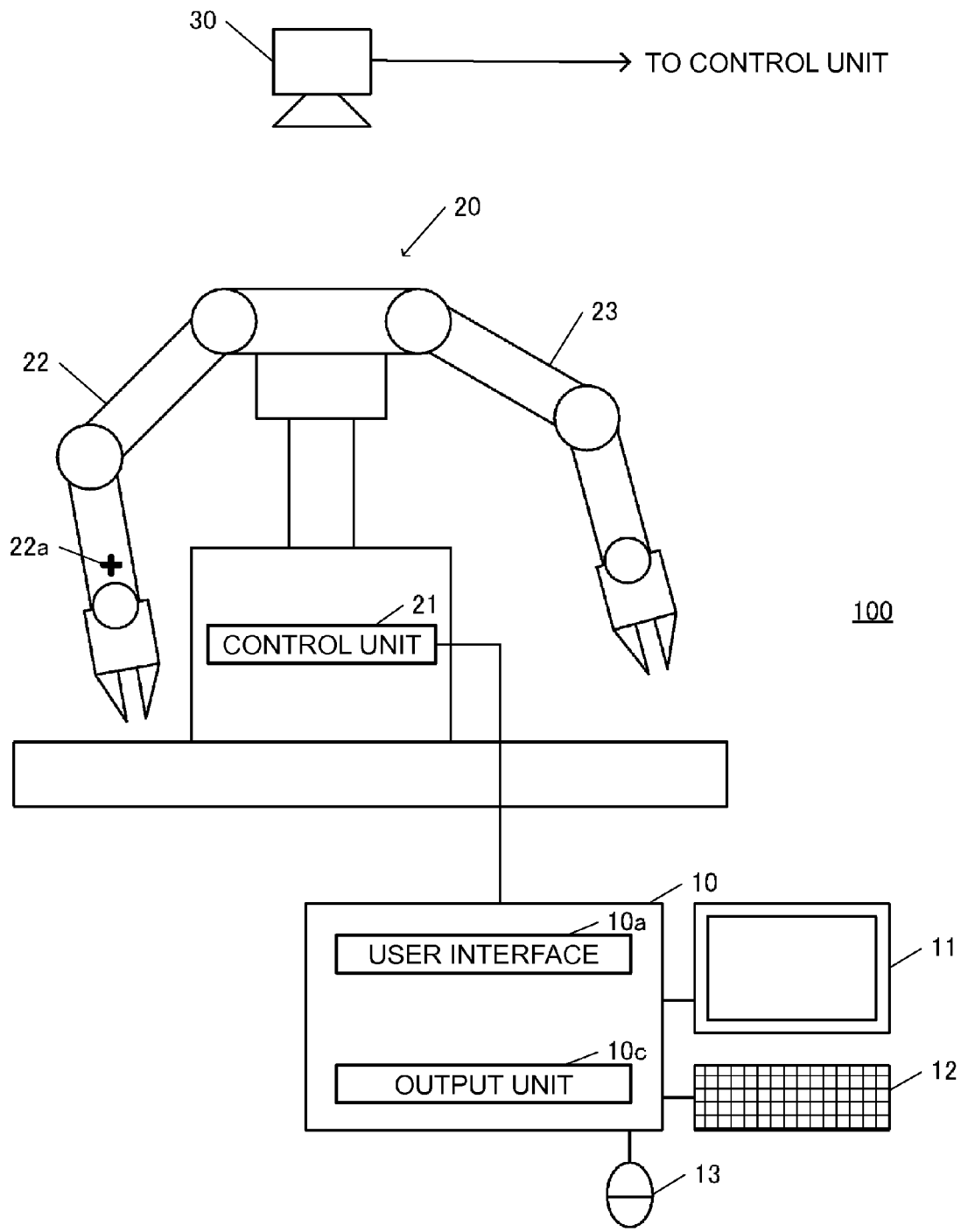
FIG. 1 is a block diagram illustrating an embodiment of the invention.

Hereinafter, exemplary embodiments of the invention will be described with reference to the accompanying drawings. In the drawings, corresponding elements will be referenced by like reference numerals and descriptions thereof will not be repeated.

1. Configuration of Robot System

FIG. 1 is a block diagram illustrating the configuration of a robot system 100 according to an exemplary embodiment of the invention. The robot system 100 includes a PC (Personal Computer) 10, a robot 20, and a digital camera 30.

The robot 20 includes a first arm 22 and a second arm 23 which are movable components and a control unit 21. Each of the first arm 22 and the second arm 23 includes plural links, inter-link rotation mechanisms, a hand, plural actuators, and a drive circuit. The posture of the first arm 22 is determined depending on the postures of the plural links of the first arm 22. That is, the posture of the first arm 22 is determined depending on the rotation angle $\theta_j$ ($j=1, 2, 3$) of each inter-link rotation mechanism in the first arm 22. The posture of the second arm 23 is determined depending on the rotation angle $\theta_j$ of each inter-link rotation mechanism in the second arm 23. A mark 22a is on the surface of a link of the first arm 22. The mark 22a is preferably a figure which can be optically recognized. The control unit 21 is a computer including a CPU, a RAM, a ROM, and an input and output unit. The control unit 21 controls the actuators of the inter-link rotation mechanisms while recognizing a workpiece through the use of the digital camera 30 and causes the first arm 22 and the second arm 23 to perform manipulations of "grasping a workpiece", "causing a workpiece to move", and "releasing a workpiece", by executing a command set output from an output unit 10c of the PC 10. The control unit 21 performs a calibration operation to be described later while acquiring image data from the digital camera 30, by loading a calibration program stored in the ROM into the RAM and causing the CPU to execute the calibration program. That is, the control unit 21 also serves as a calibrator.

The digital camera 30 is fixed to a position at which the ranges of movement of the first arm 22 and the second arm 23 can be imaged and is connected to the control unit 21 so as to be able to communicate therewith. The digital camera 30 includes an imaging unit including an area image sensor (not shown) and an optical system and a computer correcting and outputting image data output from the imaging unit.

The PC 10 includes a CPU, a RAM, a ROM, an input and output unit, and a hard disk drive, and is connected to operating devices such as a keyboard 12, a mouse 13, and a display 11. The PC 10 serves as a user interface 10*a* and an output unit 10*c* by loading a robot control program stored in the hard disk device into the RAM and causing the CPU to execute the robot control program. The user interface 10*a* displays a GUI (Graphical User Interface) on the display 11 and acquires a robot-teaching command from a user. The robot-teaching command is input to the PC 10 by the user operating the keyboard 12 and/or the mouse 13. The output unit 10*c* converts the robot-teaching command into a command set for controlling the control unit 21 and outputs the command set to the control unit 21.

2. Calibration of Robot System

The calibration of a robot system to be described below is a process of calculating a transformation parameter for correlating a three-dimensional coordinate system used to cause the control unit 21 to control the first arm 22 and the second arm 23 with a two-dimensional coordinate system of the image data output from the digital camera 30. Specifically, when the coordinate in a two-dimensional coordinate system corresponding to the position of a pixel of the mark 22*a* included in the image data output from the digital camera 30 is expressed by $(x_i, y_i)$ (where i=1, 2, . . . , 6), the coordinate in a three-dimensional coordinate system corresponding to control information used to cause the control unit 21 to control the first arm 22 and the second arm 23 is expressed by $(X_i, Y_i, Z_i)$, and the correspondence relationship of the two-dimensional coordinate system and the three-dimensional coordinate system is expressed by Expression 1, the process of calculating a transformation parameter $m=(M_{11}, \ldots, M_{34})$ corresponds to the calibration. Here, $S_i$ and $M_{11}$ to $M_{34}$ are scalar quantities.

$$s_i \begin{pmatrix} x_i \\ y_i \\ 1 \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} X_i \\ Y_i \\ Z_i \\ 1 \end{pmatrix} \quad (1)$$

In Expression 1, $M_{11}$ to $M_{34}$ are twelve unknowns. When a set of $(x_i, y_i)$ and $(X_i, Y_i, Z_i)$ which represent the same position is substituted for Expression 1, two unknowns can be deleted. Accordingly, when six sets of $(x_i, y_i)$ and $(X_i, Y_i, Z_i)$ representing six different positions are acquired, twelve unknowns ($M_{11}$ to $M_{34}$) can be analytically calculated.

By acquiring the transformation parameter m, a coordinate (x, y) of the image data output from the digital camera 30 can be transformed to a coordinate (X, Y, Z) used to cause the control unit 21 to control the first arm 22 and the second arm 23, or a coordinate (X, Y, Z) can be transformed to a coordinate (x, y). By acquiring the transformation parameter, it is possible to cause the first arm 22 and the second arm 23 to perform manipulations of "grasping a workpiece", "causing a workpiece to move", and "releasing a workpiece" while recognizing a workpiece through the use of the digital camera 30. Since a user can arbitrarily set the position and posture of the digital camera 30 relative to the robot 20 depending on the installation circumstances of the robot 20 and then can set the transformation parameter m, the user can freely set the positional relationship between the robot 20 and the digital camera 30.

Figure 2:
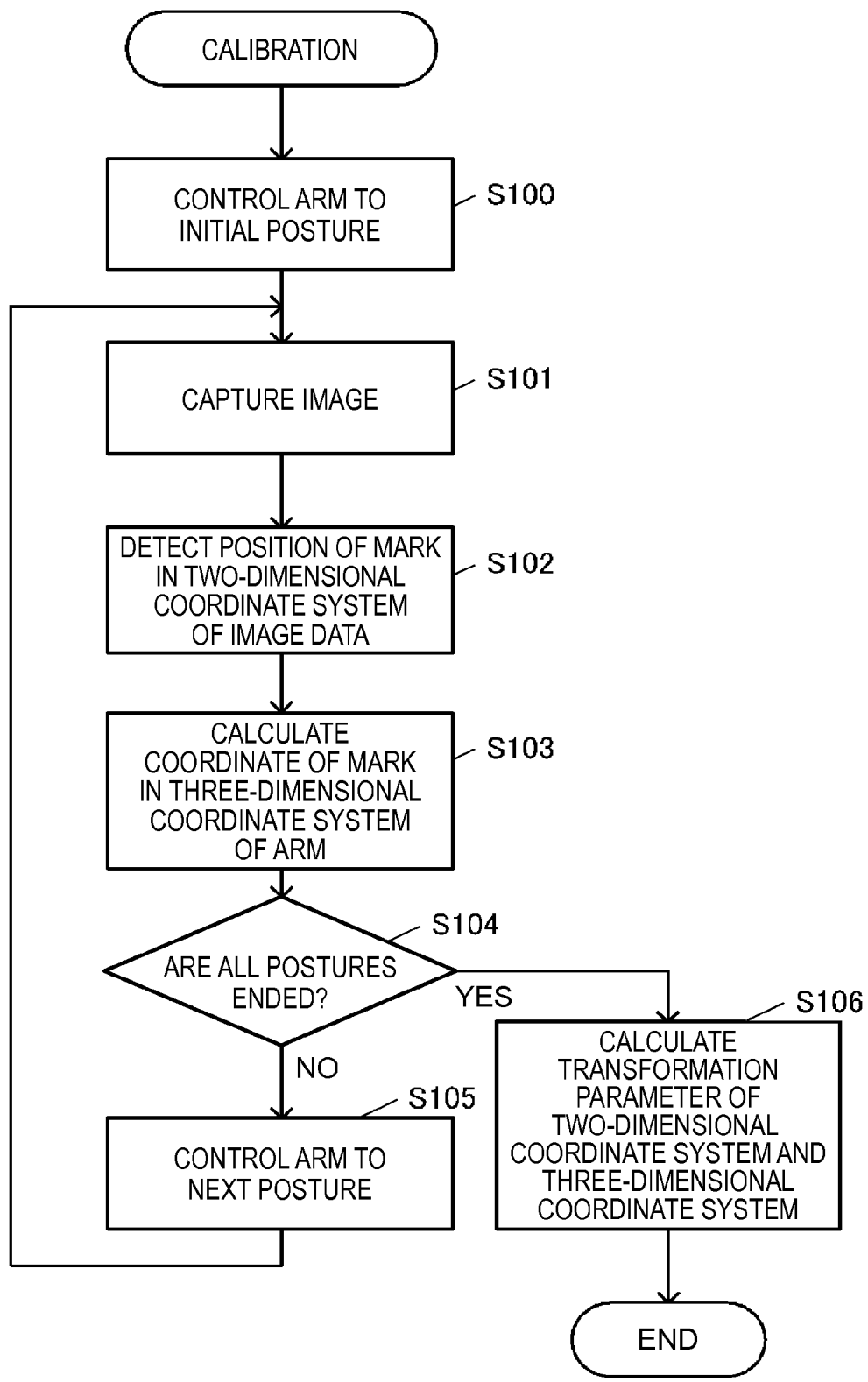
FIG. 2 is a diagram schematically illustrating an embodiment of the invention.

FIG. 2 is a flowchart illustrating the flow of calibration of a robot system using the control unit 21. The following process flow described with reference to FIG. 2 is started, for example, by receiving an instruction to start the calibration from the PC 10 or by pushing a reset switch disposed in the robot 20.

First, the control unit 21 reads control information $F_i$ (where i=1, 2, . . . , 6) for defining six postures of the first arm 22 determined beforehand for calibration from the ROM to the RAM and controls the first arm 22 to an initial posture on the basis of the control information $F_1$ (S100). The posture of the first arm 22 can be determined depending on the rotation angle of the inter-link rotation mechanisms of the first arm 22 and thus can be expressed by Expression 2. The number of rotation mechanisms of the first arm 22 is set to 3 and the rotation angles of the rotation mechanisms are set to $\theta_1$, $\theta_2$, and $\theta_3$, but the number of rotation mechanisms of the first arm 22 may be set to 2 or less or 4 or more.

$$F_i = (\theta_1, \theta_2, \theta_3) \quad (2)$$

Specifically, the control unit 21 sets i=1, reads the control information $F_i$ (where i=1, 2, . . . , 6) from the RAM to the CPU, and controls the actuators of the rotation mechanisms of the first arm 22 using $F_1$ as a target value. In this exemplary embodiment, since the control information $F_i$ for calibration is determined beforehand, the positional relationship between the robot 20 and the digital camera 30 should be set so that the mark 22*a* of the first arm 22 in the posture determined by $F_i$ is visible from the digital camera 30, but a user may set the control information $F_i$ for calibration within the range in which the mark 22*a* of the first arm 22 is visible from the digital camera 30.

Then, the control unit 21 instructs the digital camera 30 to capture an image and acquires image data from the digital camera 30 (S101). Accordingly, the control unit 21 acquires the image data obtained by imaging the arm 22*a* of the first arm 22.

Then, the control unit 21 analyzes the acquired image data and detects the position of the mark 22*a* in the two-dimensional coordinate system of the image data (S102). Techniques such as known pattern matching can be used to detect the mark 22*a*. The position of the mark 22*a* is calculated, for example, as the coordinate $(x_i, y_i)$ of a pixel located at the center of gravity of the mark 22*a* with one pixel out of four vertices of the image data as an origin. The control unit 21 stores the calculated coordinate $(x_i, y_i)$ in the two-dimensional coordinate system until calculating the transformation parameter.

Then, the control unit 21 calculates the three-dimensional coordinate $(X_i, Y_i, Z_i)$ of the mark 22*a* on the basis of the control information $F_i$ used to control the first arm 22 (S103). The position of the mark 22*a* is expressed by the rotation angles θj of the rotation mechanisms of the first arm 22, the relative positions and postures of the rotation shafts of the rotation mechanisms of the first arm 22, and the relative position of the mark 22*a* to the rotation shaft of the link with the mark 22*a* attached thereto. Specifically, when the position and posture of the third link with the mark 22a attached thereto is determined by the rotation angles of three rotation mechanisms of the first arm 22, the position of the mark 22a is expressed by $(F_i, p_1, p_2, p_3, p_4)$. Here, $p_1$ is a vector in the coordinate system fixed to a non-movable portion of the robot 20, that is, a vector in the three-dimensional coordinate system used to control the first arm 22, and represents the position and posture of the rotation shaft of the first link fixed to the non-movable portion of the robot 20. $P_2$ is a vector in the coordinate system fixed to the first link and represents the position and posture of the rotation shaft connecting the first link and the second link. $P_3$ is a coordinate in the coordinate system fixed to the second link and represents the position and posture of the rotation shaft connecting the second link and the third link. $P_4$ is a coordinate in the coordinate system fixed to the third link and represents the position of the center of gravity of the mark 22a relative to the rotation shaft connecting the second link and the third link. The control unit 21 linearly transforms the position of the mark 22a expressed in this way to a coordinate $(X_i, Y_i, Z_i)$ in the three-dimensional coordinate system fixed to the non-movable portion of the robot 20. The control unit 21 stores the coordinate $(X_i, Y_i, Z_i)$ in the three-dimensional coordinate system calculated through the use of the linear transformation until calculating the transformation parameter.

Then, the control unit 21 determines whether the processes of steps S101 to S103 are performed on all the predetermined six postures (S104).

When the processes of steps S101 to S103 are not yet performed on all the predetermined six postures, the control unit 21 sets increment of i=i+1, and controls the first arm 22 on the basis of the next control information $F_i$, and performs the processes of steps S101 to S104 again.

When the processes of steps S101 to S103 are performed on all the predetermined six postures, the control unit 21 calculates a transformation parameter for correlating the two-dimensional coordinate system of the image data and the three-dimensional coordinate system used to control the first arm 22 on the basis of the coordinate $(x_i, y_i)$ in the two-dimensional coordinate system detected in step S102 and the coordinate $(X_i, Y_i, Z_i)$ in the three-dimensional coordinate system calculated in step S103. Specifically, the transformation parameter is calculated as follows.

Expression 1 can be reduced to Expression 3.

$$S_i x_i = MX_i \quad (3)$$

Expression 3 has indefiniteness of a scalar multiple. By deleting $s_i$ from Expression 3 and arranging the expression with respect to $M_{11}$ to $M_{34}$, Expression 4 can be established.

$$A(x_i, X_i)m = 0 \quad (4)$$

Here, $A(x_i, X_i)$ can be expressed by Expression 5, and m corresponds to the transformation parameter for correlating the two-dimensional coordinate system of the image data with the three-dimensional coordinate system used to control the first arm 22.

$$A(x_i, X_i) = \begin{pmatrix} X_i & Y_i & Z_i & 1 & 0 & 0 & 0 & 0 & x_i X_i & x_i Y_i & x_i Z_i & x_i \\ 0 & 0 & 0 & 0 & X_i & Y_i & Z_i & 1 & y_i X_i & y_i Y_i & y_i Z_i & y_i \end{pmatrix} \quad (5)$$

$$m = (M_{11}, \ldots, M_{34})^T \quad (6)$$

Now, m is calculated which minimizes a function f(m) expressed by Expression 7 using the coordinate $(x_i, y_i)$ in the two-dimensional coordinate system detected in step S102 and the coordinate $(X_i, Y_i, Z_i)$ in the three-dimensional coordinate system calculated in step S103.

$$f(m) = \sum_i \|A(x_i - X_i)m\|^2 \quad (7)$$

This is a problem of calculating the extreme value of a function h(m, λ) expressed by Expression 8 by introducing an undetermined multiplier X and a binding condition g(m)=0, using the Lagrange's method of undetermined multipliers.

$$h(m,\lambda) = f(m) + \lambda g(m) \quad (8)$$

Here, in order to remove the indefiniteness, the binding condition is set to $\|m\|=1$ and Expression 9 is set, m minimizing the function f(m) is m satisfying Expression 10.

$$g(m) = 1 - \|m\|^2 \quad (9)$$

$$\frac{\partial}{\partial m} h(m, \lambda) = 0 \quad (10)$$

The left side of Expression 10 can be changed to Expression 11.

$$\frac{\partial}{\partial m} h(m, \lambda) = \frac{\partial}{\partial m}\left[m^T \sum_i \{A(x_i, X_i)^T A(x_i, X_i)\}m + \lambda(1 - m^T m)\right] \quad (11)$$
$$= \sum_i \{A(x_i, X_i)^T A(x_i, X_i)\}m - \lambda m$$

Therefore, the control unit 21 can calculate an eigenvector of a matrix expressed by Expression 12 as the transformation parameter m.

$$\sum_i \{A(x_i, X_i)^T A(x_i, X_i)\} \quad (12)$$

In the above-mentioned calibration of the robot system 100, since a user does not have to store a subordinate calibration pattern member not used in manipulating a workpiece or does not have to cause the arm of the robot 20 to grasp the pattern member, it is possible to facilitate the calibration of the robot system 100. Since the arm of the robot 20 does not have to grasp the pattern member, it is possible to perform calibration even during activation of the robot 20.

3. Other Embodiments

The technical scope of the invention is not limited to the above-mentioned embodiments, but can be modified in various forms without departing from the concept of the invention. For example, a mark may be attached to the surface of each of two or more links of the first arm 22. Accordingly, it is possible to shorten the time necessary for calibration. For example, when the mark is attached to the surface of each of two links of the first arm 22, it is possible to calculate the transformation parameter through the use of the above-mentioned algorithm on the basis of the image data obtained by imaging the marks controlled at six different positions by controlling the first arm 22 to three postures and acquiring image data for each posture. Even when a mark is attached to each of the first arm 22 and the second arm 23 and the first arm 22 and the second arm 23 are made to simultaneously move to perform calibration, it is possible to shorten the time necessary for calibration. When the number of marks increases, the number of pieces of image data necessary for calculating the transformation parameter is only required to be one even using the above-mentioned algorithm.

Since the degree of freedom of the mark with respect to the digital camera is six, six pieces of position information of the mark as the information for calculating the transformation parameter is redundant. That is, the number of pieces of mark position information necessary for calculating the transformation parameter is determined depending on a mathematical algorithm for calculating the transformation parameter, and may be five or less or seven or more. The algorithm used for the calibration is a statistical technique. Accordingly, when the number of pieces of mark position information necessary for calculating the transformation parameter is large, it is possible to enhance the calibration precision accordingly.

The type of the movable component with a mark attached thereto may be a rotating arm or hand, or a linearly-moving rod or cylinder. The mark may be formed of a light source, a magnetic material, a heat source, a sound source, or the like. Using a magnetic sensor for the position of the mark formed of a magnetic material, using a heat sensor for the mark formed of a heat source, and using a sound sensor for the mark formed of a sound source, the positions can be specified in the two-dimensional coordinate system.

Figure 3:
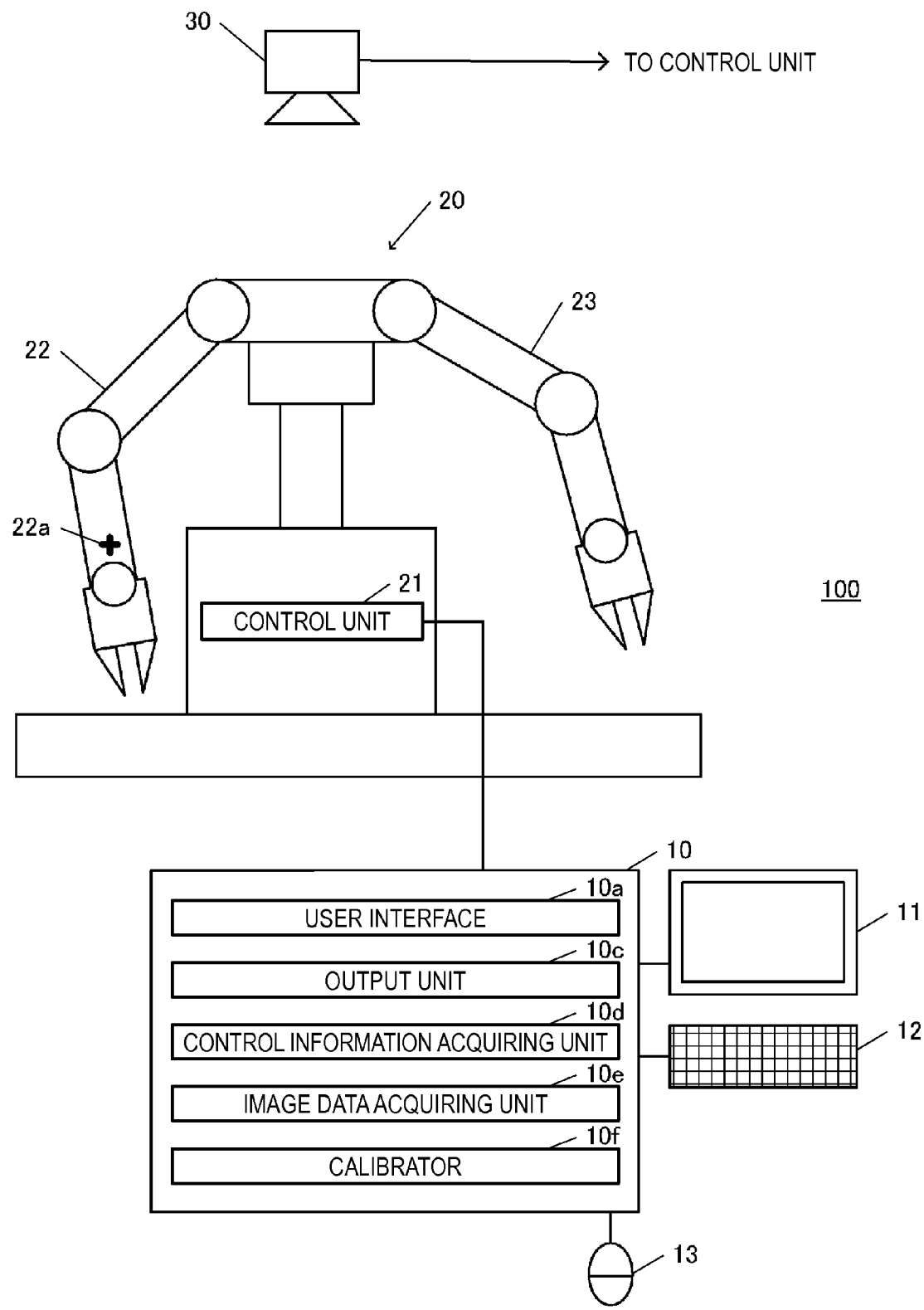
FIG. 3 is a block diagram illustrating an embodiment of the invention.

A calibrator may be disposed outside the robot 20, such as the PC 10 serving as a calibration device separated from the robot 20. When the PC 10 serves as a calibration device, a calibration program causing the PC 10 to serve as a control information acquiring unit 10d, an image data acquiring unit 10e, and a calibrator 10f is stored in the hard disk device of the PC 10, as shown in FIG. 3. Here, the control information acquiring unit 10d acquires control information for controlling the first arm 22 of the robot 20 with the mark 22a attached thereto. The control information may be acquired as a constant of the calibration program stored in advance in the hard disk device, or may be acquired from the control unit 21 of the robot 20. When the calibration is performed using the control information stored as the constant of the calibration program in advance in the hard disk device, the PC 10 outputs the control information $F_i$ read from the hard disk device to the control unit 21 of the robot 20 and controls the first arm 22. The image data acquiring unit 10e acquires image data obtained by imaging the mark 22a controlled at different positions depending on the control information from the digital camera 30. The calibrator 10f creates the transformation parameter m on the basis of the image data including the mark 22a and the control information and outputs the transformation parameter to the control unit 21 of the robot 20.

By causing the CPU of the digital camera 30 to execute the calibration program including the control information acquiring unit 10d, the image data acquiring unit 10e, and the calibrator 10f, the digital camera 30 may serve as a calibration device.

The entire disclosure of Japanese Patent Application Number 2012-090844 filed Apr. 12, 2012 is expressly incorporated by reference.

What is claimed is:

1. A robot system comprising:
a first movable component on which a first mark is provided, the first movable component being moved by a first actuator;
a second movable component on which a second mark is provided, the second movable component being moved by a second actuator;
a control unit that controls the first and second actuators to respectively move the first and second movable components in a three-dimensional coordinate system based on control information;
a camera that takes an image of the first and second marks so as to output image data when the first and second marks are located at different positions; and
a calibrator that creates a transformation parameter for correlating a two-dimensional coordinate system of the image data with the three-dimensional coordinate system based on the image data and the control information,
wherein the control unit causes the first and second movable components to perform manipulations of moving a work piece.

2. The robot system according to claim 1, further comprising an output unit that outputs the transformation parameter to the control unit for controlling the first and second actuators.

3. The robot system according to claim 1, wherein the calibrator creates the transformation parameter based on the image data obtained by taking the image of the first and second marks when the first and second marks are located at six different positions.

4. The robot system according to claim 3, wherein when a coordinate of the first and second marks in the two-dimensional coordinate system is expressed by $(x_i, y_i)$ (where $i=1, 2, ..., 6$), a coordinate of the first and second marks in the three-dimensional coordinate system is expressed by $(X_i, Y_i, Z_i)$, and a correspondence relationship between the two-dimensional coordinate system and the three-dimensional coordinate system is expressed by:

$$s_i \begin{pmatrix} x_i \\ y_i \\ 1 \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} X_i \\ Y_i \\ Z_i \\ 1 \end{pmatrix},$$

an eigenvector $m=(M_{11}, \ldots, M_{34})$ of a matrix expressed:

$$\sum_i \{A(x_i, X_i)^T A(x_i, X_i)\}$$

is used as the transformation parameter.

5. A calibration method of a robot system, comprising:
causing first and second movable components on which first and second marks are respectively provided to move in a three-dimensional coordinate system based on control information by first and second actuators that are respectively provided at the first and second movable components;
acquiring image data by taking an image of the first and second marks via a camera when the first and second marks are located at different positions; and
correlating a two-dimensional coordinate system of the image data with the three-dimensional coordinate system based on the image data and the control information,
wherein the control unit causes the first and second movable components to perform manipulations of moving a work piece.

6. A robot comprising:
a control information acquiring unit that acquires control information for controlling first and second actuators that are respectively provided at first and second movable components on which first and second marks are respectively provided to respectively move the first and second movable components in a three-dimensional coordinate system;

an image data acquiring unit that acquires image data obtained by taking an image of the first and second marks via of a camera when the first and second marks are located at different positions; and a calibrator that creates a transformation parameter for correlating a two-dimensional coordinate system of the image data with the three-dimensional coordinate system based on the image data and the control information, wherein the control unit causes the first and second movable components to perform manipulations of moving a work piece.

* * * * *